Dec. 6, 1955     J. A. KANUCH     2,725,890
HYDRAULIC POWER CONTROL SYSTEM
Filed March 22, 1950     4 Sheets-Sheet 3
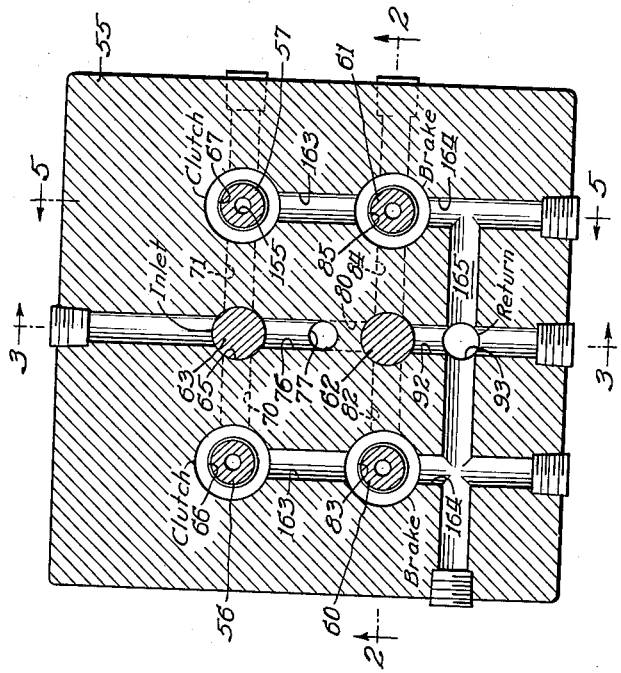
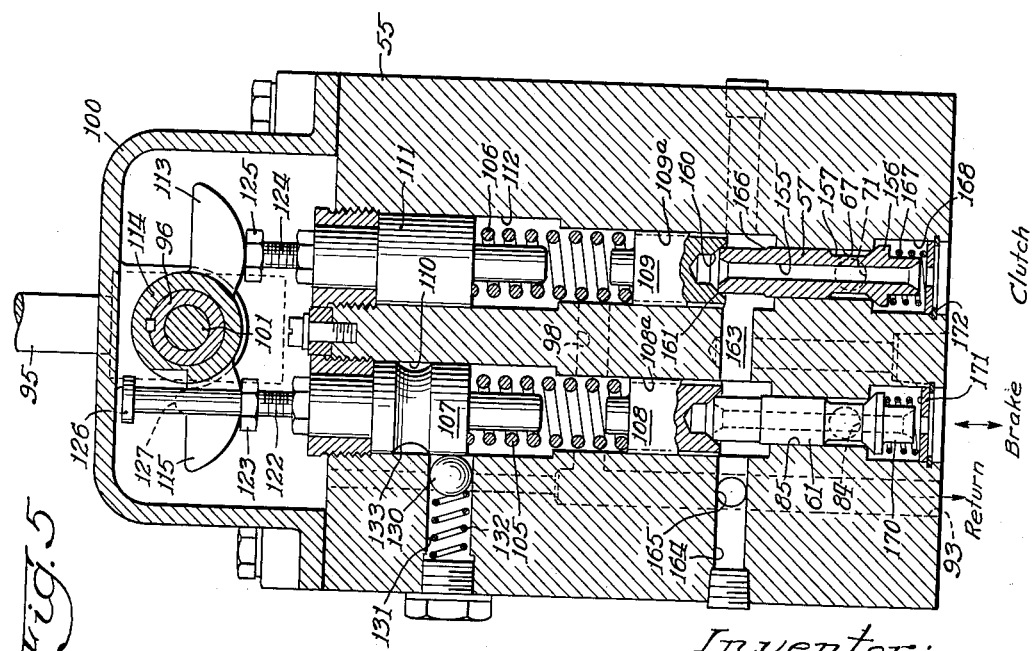
Inventor:
John A. Kanuch

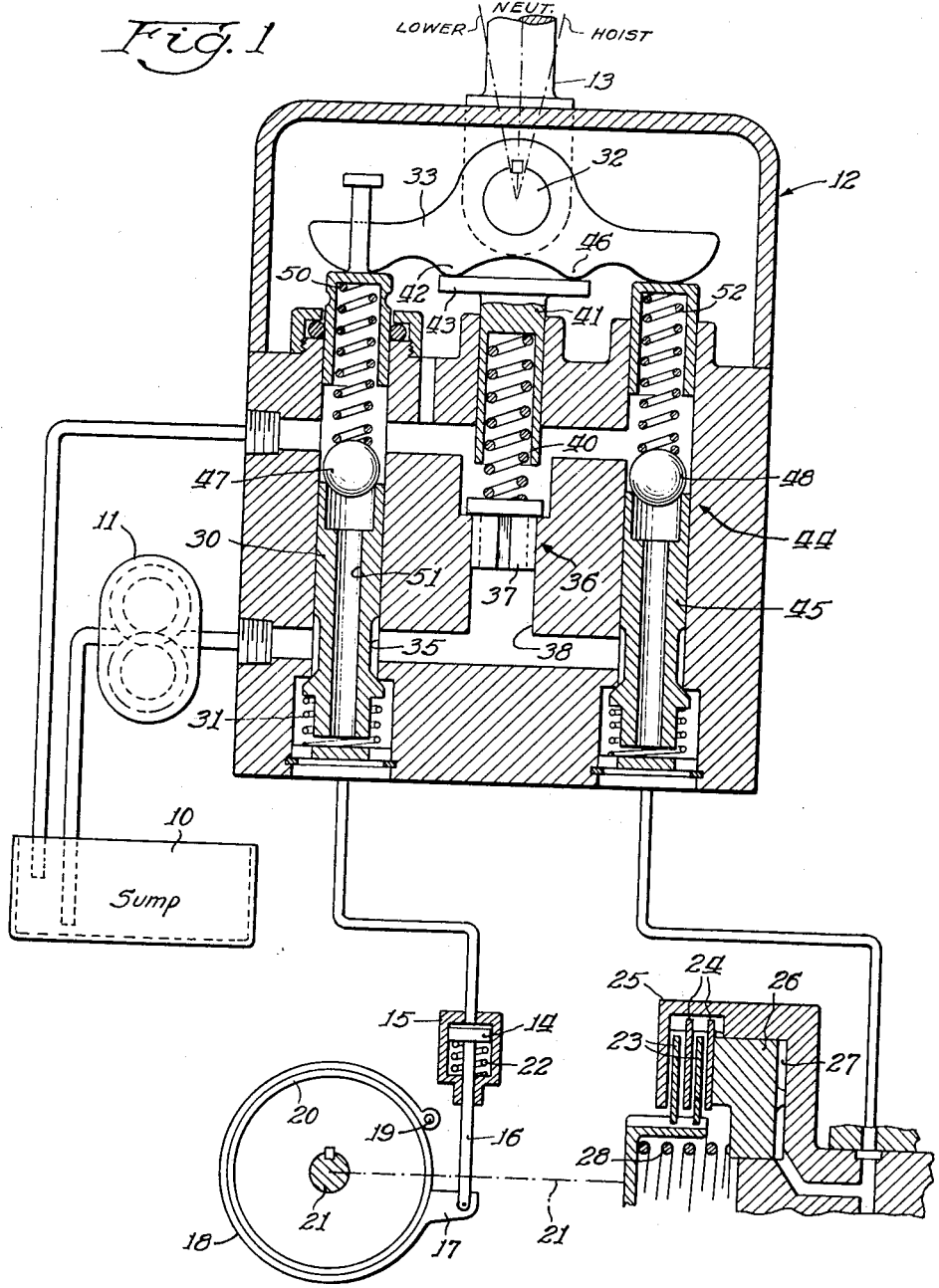

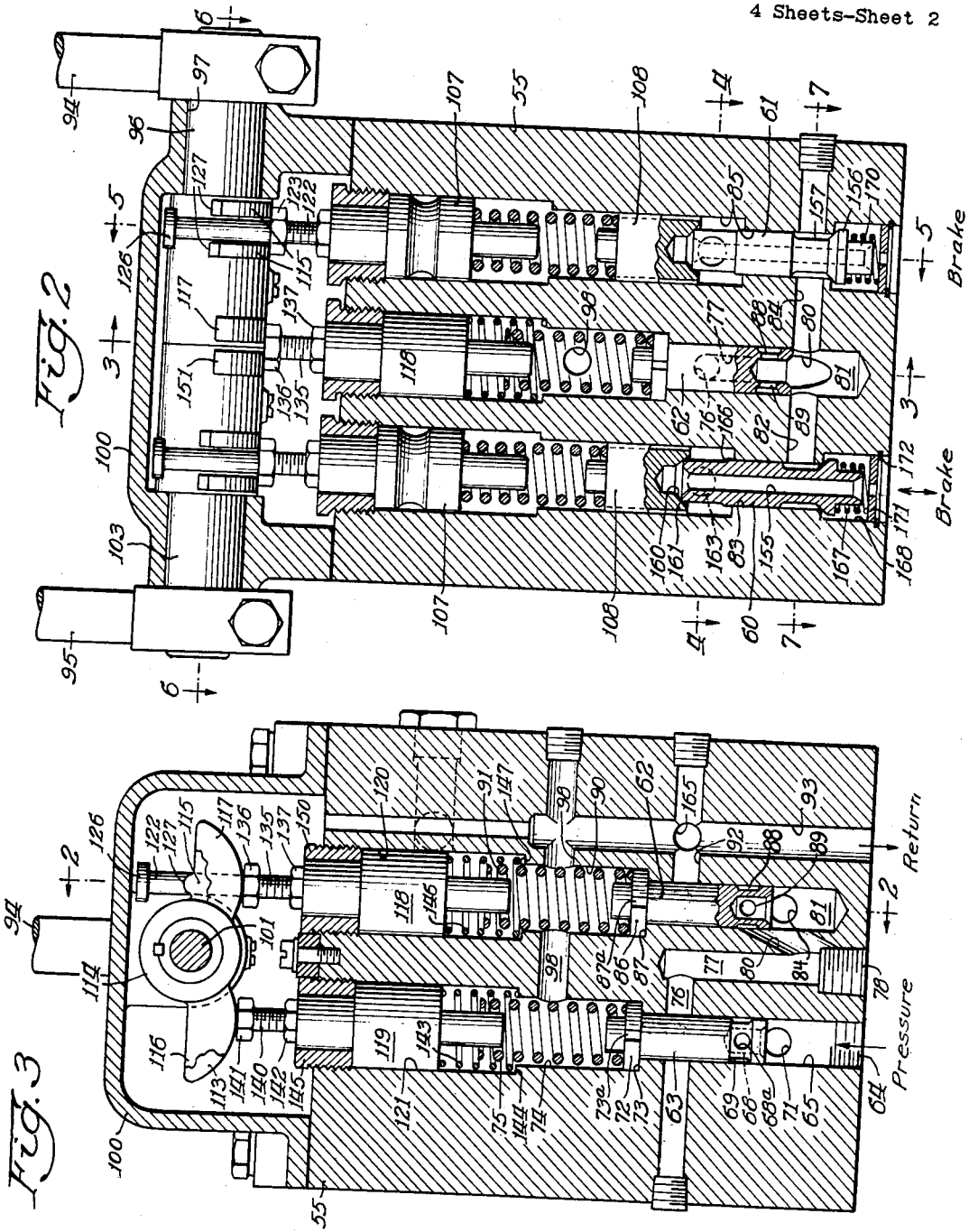

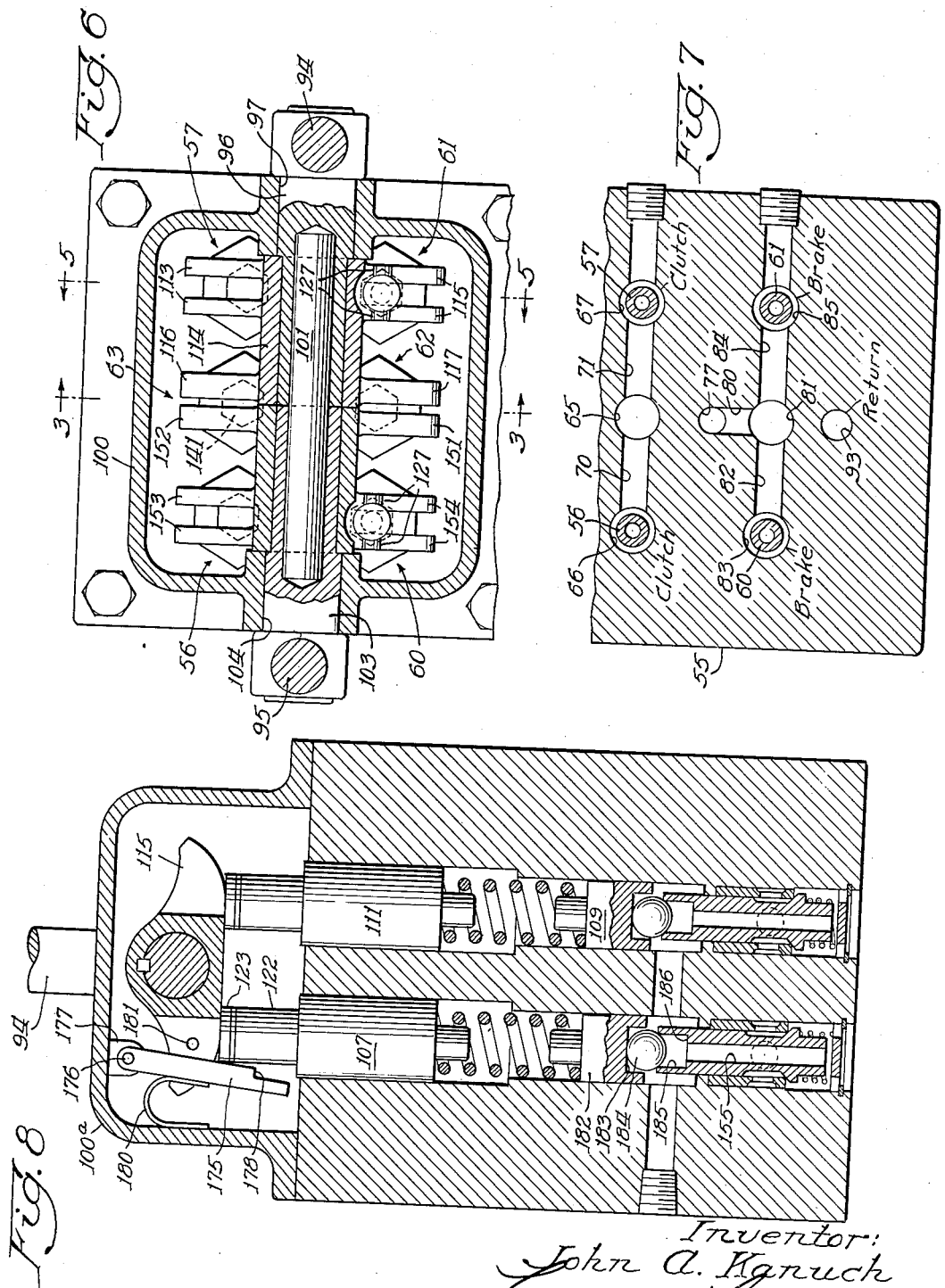

United States Patent Office 2,725,890
Patented Dec. 6, 1955

2,725,890

HYDRAULIC POWER CONTROL SYSTEM

John A. Kanuch, South Euclid, Ohio, assignor to Borg-Warner Corporation, Chicago, Ill., a corporation of Illinois Application March 22, 1950, Serial No. 151,152

11 Claims. (Cl. 137—115)

This invention relates to a hydraulic power control system, and more particularly to a hydraulic power control system of the type adapted for controlling the actuation of brake and clutch motors such as may be associated with a winch.

A primary disadvantage of many hydraulic power control systems of the type heretofore available, particularly where employed with high pressures, has been the waste of power during the time the hydraulically actuated device is not utilizing pressure. During this standby time, the hydraulic pressure is usually bypassed through a relief valve, the relief valve being, in accordance with conventional practice, set to open at a pressure slightly higher than the highest pressure required in the actuation of the hydraulic device so that full operating pressure is always readily available. Thus, under all conditions of operation, the pressure source, for example, a gear pump, is under a load and is under maximum load during the standby period. As a result, wear is undesirably heavy, and the pump must be designed for continuous operation under full load, this requiring a considerably heavier duty pump than where full load is only required intermittently.

For example, hydraulic pressure may be employed in conjunction with machinery operating a power shovel, a crane, or drag-lines, which machinery may require a drum with a brake or holding arrangement and a clutch to drive the drum. A hydraulic pressure control assembly is employed to actuate either the clutch or the brake, as required, and actuation of either ordinarily is intermittent. Thus, there is a considerable standby period during which the pressure output from the pressure source must be bypassed. At the same time, hydraulic pressure must be instantly available to actuate the clutch or the brake when required. In such arrangements, it is the usual practice to employ a relief valve in the pressure system, the relief valve being set to open at a pressure somewhat in excess of the maximum pressure required to operate either the clutch or the brake. Accordingly, during the standby condition, the pressure source continues under maximum load, with resultant waste of power, excessive heating of the hydraulic fluid, and undue wear of the hydraulic pressure generating equipment.

An object of the present invention is to provide a new and improved hydraulic power control system, and particularly a more efficient hydraulic system wherein the pressure supplied at any instant is proportioned or conditioned to the needs of the system so that in the standby condition, only minimum pressure is developed by the pressure generator, and as the pressure needs of the system increase, the pressure available is correspondingly increased.

A further object of the present invention is to provide a hydraulic power control system of the type indicated wherein a clear indication by pressure reaction, that is, by hydraulic feel, is provided for the operator, thus facilitating accurate control of the devices to be operated.

In accordance with one embodiment of this invention, as applied to a hydraulic power control system operating a brake and clutch assembly, a variable relief valve is provided in conjunction with one or more sets of fluid control valves connected to the brake and clutch actuating devices in such manner that opening of either control valve for actuation of the associated device causes a relief valve opening control spring associated with the relief valve to be compressed, thereby increasing the pressure value at which the associated relief valve will open. The degree of compression of the relief valve spring is proportioned so that the pressure in the system at all times exceeds by a slight amount the pressure required by the devices to be actuated. Thus, when no actuating pressure is required, the relief valve bypasses at a minimum pressure level, thereby reducing the overall work load on the system and greatly increasing its useful life by minimizing wear. The arrangement of the invention also produces smoother operation of the clutch or brake and enables closer control of actuation by providing a pressure reaction clearly sensible to the operator.

Other objects and advantages of the present invention will be apparent from the following detailed description taken in conjunction with the drawings wherein:

Fig. 1 is a schematic view of a single hydraulic pressure control system in accordance with one embodiment of this invention;

Fig. 2 is a vertical, sectional view of a dual hydraulic pressure control system in accordance with this invention, the view being taken substantially along the line 2—2 of Figs. 3 and 4 and showing to advantage two brake control valves and their associated relief valve;

Fig. 3 is a vertical, sectional view taken substantially along the line 3—3 of Figs. 2 and 4 and showing primarily the two relief valves of the dual system;

Fig. 4 is a transverse, sectional view taken substantially along the line 4—4 of Fig. 2;

Fig. 5 is a vertical, sectional view similar to Fig. 3, taken, however, along the line 5—5 of Fig. 2 and showing a brake control valve and a clutch control valve;

Fig. 6 is a plan view, partially in section, showing the arrangement of the control cams in the dual hydraulic pressure control system;

Fig. 7 is a fragmentary, transverse, sectional view similar to Fig. 4, but taken substantially along the line 7—7 of Fig. 2; and Fig. 8 is a view similar to Fig. 5 showing, however, a different latching arrangement for holding the brake released and a modified form of control valve.

In order to facilitate understanding of the invention, the hydraulic valve control system of the invention will be first described in conjunction with a hydraulically controlled winch assembly having associated therewith a brake for holding the winch drum stationary and a clutch engageable with a driven shaft to cause rotation of the winch drum. Both the brake and the clutch are controlled by hydraulically actuated pistons connected to a suitable pressure source through the control valve assembly of this invention. In Figs. 2 through 8, a production form of dual control system is illustrated providing means for operating two winches independently. However, it will be apparent that the invention is equally applicable to a single winch or to more than two winches.

Referring now to Fig. 1 of the drawings wherein the invention is illustrated as employed for controlling a single winch, and more particularly for controlling the actuation of the brake and clutch associated therewith, as referred to above, there is provided a reservoir or sump 10 for supplying hydraulic fluid to the system, and a pressure generator 11, such as a gear pump, is connected to the source 10 to provide the requisite hydraulic pressure. Pressure from the pressure generator 11 is supplied to a hydraulic pressure control valve assembly designated generally at 12, the same comprising the primary subject of this invention, and in accordance with the position of control lever 13, hydraulic pressure is applied either to a brake actuating piston 14 or to a clutch actuating piston 26.

It will be understood that both the brake and the clutch arrangements of which the pistons form a part of the servo system are shown by way of example only and to facilitate an understanding of the invention, and that many other brake or clutch arrangements may be employed without departing from the invention.

The brake is normally engaged but may be released by application of hydraulic pressure to piston 14 journalled in piston chamber 15; thus, the outer end of the brake piston rod 16 is pivotably connected to a lug 17 mounted at one end of a brake band 18. The other end of the brake band 18, in accordance with conventional practice, is secured to a fixed post 19. Brake band 18 encircles a drum 20 splined to a shaft 21 of the winch assembly and is normally held in engaged position by a helically coiled spring 22 disposed about piston rod 16 and urging the piston toward its retracted position. Application of hydraulic pressure to the brake piston 14 releases the brake.

A suitable clutch assembly for rotating the winch drum 20 may comprise a plurality of axially fixed friction discs 23 connected to winch shaft 21 and a cooperating set of axially movable friction discs 24 splined to a drum 25 driven by a suitable motor (not shown). A piston 26 is provided for engaging the discs 24 with the discs 23 to establish a driving connection, the piston being disposed in a suitable chamber 27. Spring 28 functions to yieldably hold piston 26 in its clutch disengaging position. By application of fluid pressure to the back of piston 26, the piston moves against spring 28 engaging the clutch members.

From the foregoing, it will be evident that while the brake may be released as, for example, to permit the winch to rotate to lower the load, or the clutch may be engaged to drive the winch to raise the load, ordinarily there will be substantial periods during which neither hydraulic piston will require actuation. The present invention provides means for reducing the system hydraulic pressure to a minimum value during this standby time.

In Fig. 1 wherein the valve mechanism 12 is indicated somewhat schematically, it will be seen that this is accomplished by providing a brake disengaging control valve 30, which is held normally closed by an associated spring 31 but which may be opened by pivoting the control lever 13 to the left, as viewed in this figure, thereby rotating shaft 32 to which a double cam member 33 is keyed. Pivoting cam 33 to the left causes plunger valve 30 to move downward, thereby opening a passage through the brake control valve chamber 35 from the pump 11 to the brake piston 14 and applying actuating pressure to the brake piston to disengage the brake.

In order to control the system pressure to a suitable value, in accordance with this invention, there is provided a variable relief valve 36, comprising essentially a plunger valve body 37 slidably journalled in relief valve chamber 38. The relief valve is normally held closed by a spring 40, the compression exerted by spring 40 being regulated by the position of a sleeve shaped retaining cap member 41 slidably journalled in the upper portion of the valve chamber. When the cam arm 33 is in its neutral position, that is, when the lever arm 13 is not pivoted to the right or to the left, the sleeve is then in its uppermost position, thus providing minimum compression on spring 40. With minimum compression on spring 40, the relief valve will open at its lowest pressure value, thereby bypassing and permitting return to the sump of fluid pressure generated by pump 11. However, when the cam arm 33 is pivoted in a counterclockwise direction to move brake control valve 30 downwardly, a land or projection 42 formed on the under side of cam 33 is caused to engage the upper surface of a flanged end portion 43 provided at the upper end of sleeve cap 41, thereby moving the sleeve downwardly in proportion to the movement of the control lever arm 13. Compression of spring 40 raises the pressure level at which the relief valve will open. In accordance with the invention, the compression of spring 40 and the radial position of land 42 is selected with reference to the pressure needs of the system so that the relief valve is set to open at a pressure slightly exceeding at all times the pressure required for actuating the piston of either the brake or the clutch, as determined by the position of lever arm 13. Thus, when the lever arm is moved to its furthest pivoted position toward the left, maximum pressure is provided in the system, and the relief valve is set to open at its highest possible value.

A similar control valve arrangement 44 is provided for the clutch piston 26, the clutch control valve plunger 45 being moved downwardly to permit fluid to be applied to the clutch to energize the clutch by pivoting the control arm 13 to the right or Hoist position, as designated in the drawing. Movement of the lever arm to the right causes a second land or downward projection 46 formed on the under side of the cam arm 33 to engage the flange 43 at its right side, as viewed in this figure, thereby to move downwardly the sleeve cap 41 of the relief valve spring 40 and to increase the relief pressure level.

Return of pressure to the sump 10 from the brake position is controlled by a regulator valve 47 associated with brake control valve 30 and from the clutch piston by a regulator valve 48 associated with clutch control valve 45. A spring 50 is associated with regulator valve 47 and normally holds the valve seated at the upper end of an axially extending passage 51 formed through the center of plunger valve 30 and communicating at its lower end with the piston chamber of the brake. Spring 50 is selected to provide a compression force of a value such that the pressure exerted by energizing spring 22 associated with piston 14 is sufficient in the absence of fluid pressure from pump 11 on piston 14 to open the regulator valve 47 and permit return of fluid to the sump, thus permitting engagement of the brake. It will be noted from Fig. 1 that when the control arm 13 is pivoted to the left to push the plunger valve 30 downwardly, the regulator spring 50 is compressed at the same time as spring 40 associated with the relief valve 36, thereby setting to a higher value the pressure required to open regulator valve 47. In the event excessive pressure is applied to brake piston 14 during actuation, it will be evident that regulator valve 47 will also be unseated. Regulator valve 48 and spring 52 operate in similar manner to regulate the maximum pressure which may be applied to the clutch piston 26 and, also, to permit return of fluid pressure to the sump when the lever arm is in a neutral position or moved toward the Lower position.

Because the movement of lever arm 13 is resisted by the several springs acting against the under side of cam 33, and the amount of resistance may be made proportional to the degree of movement of the lever, a direct pressure reaction is felt by the operator, and this reaction provides an accurate indication of the operating condition.

Referring now to the detail drawings, Figs. 2 through 8, it will be seen that the dual control valve assembly in accordance with this invention may comprise a generally rectangular valve block housing 55 enclosing two clutch control valves 56 and 57, two brake control valves 60 and 61, a relief valve 62 for the brake control valves and a relief valve 63 for the clutch control valves. These valves are interconnected by passages, as hereinafter described, to provide the control system of the invention.

Inlet pressure from a suitable source of hydraulic pressure, such as a gear pump (not shown), is applied to the control valve assembly through an inlet port 64 provided at the lower end of clutch relief valve chamber 65, as shown in Fig. 3. Inlet pressure is communicated directly from the chamber 65 to clutch control valve chambers 66 and 67, associated respectively with the clutch control valves 56 and 57 through a passage 70 extending to the left, as viewed in Fig. 7, and a passage 71 extending to the right, from the lower portion of chamber 65.

Relief valve plunger 63 slidably journalled in chamber 65 comprises a generally cylindrical body portion having a flange or shoulder 72 formed at the upper end thereof, the shoulder 72 seating on a rim 73 formed at the junction of the upper end of chamber 65 with a somewhat larger chamber 74 enclosing the lower portion of a relief valve regulator spring 75. The position of rim 73 and shoulder 72 are selected so that even when the valve plunger 63 is in its lowermost position, the sidewardly extending passages 70 and 71 leading to the clutch control valves are always open and, thus, fluid pressure is always available at the clutch control valves, the pressure level being regulated by the relief valve 63. One or more axially extending grooves 73-a are provided in the periphery of rim 73 to prevent hydraulic blocking of valve action.

In the neutral condition of this control valve assembly, spring 75 is under no compression and, accordingly, pressure exerted against the under side of relief valve plunger 63 causes the plunger to move upwardly. In practice, the spring 75 is selected to have a length and compression force such that valve plunger 63 may move upwardly a substantial distance and relieve pressure before encountering substantial resistance so that fluid pressure at the minimum level established by regulator spring 75 may be communicated from the inlet port 64 to the clutch control valves 56 and 57. Under normal operating conditions, the pump is constantly supplying pressure, thereby causing clutch relief valve 63 to move upward and when the compression force of spring 75 is exceeded to apply pressure to the brake relief valve 62 and from there to the brake control valves 60 and 61.

It will be noted that the lower end of valve 63 is provided with a deep, cylindrical recess 68 which communicates through radially extending apertures 68-a with an annular groove 69 formed about the periphery of the valve body. In this manner, pressure on the valve is balanced and wear held to a minimum.

Pressure is communicated to the brake control valves 60 and 61 from a first passage 76, placed in communication with inlet pressure when the clutch relief valve is in its open, or partially open, position. When the valve 63 is pushed upwardly due to pressure applied to the lower end of valve 63, groove 69 is placed in communication with passage 76, thus supplying pressure to this passage metered in accordance with the relief valve setting. Short passage 76, as viewed in Fig. 3, is connected at its left end with chamber 65 at a point adjacent the upper end thereof and connects at its right end with a vertically extending passage 77, the lower end of which is closed by a plug 78. Passage 77 connects adjacent its lower end with an upwardly extending passage 80, the upper end of which is connected to a vertically extending chamber 81 in which the relief valve 62 for the brake control valves is journalled. Pressure is supplied directly from the lower end of chamber 81 to the brake control valves, irrespective of the position of brake relief valve 62.

Referring now to Fig. 7, it will be seen that a passage 82 extending to the left from chamber 81 communicates at its left end with chamber 83 in which brake control valve 60 is slidably journalled and that a second similar passage 84, extending to the right from chamber 81, communicates at its right end with a chamber 85 in which the second brake control valve plunger 61 is slidably journalled. It will, thus, be evident that so long as the clutch relief valve 63 is open and supplying pressure through the passages 76, 77 and 80, pressure is always supplied to the brake control valves.

Brake relief valve 62 is identical in construction with clutch relief valve 63, brake relief valve 62 having a peripheral groove 88 connected to the recessed lower end of the valve by radial apertures 89 to provide balanced distribution of pressure. A flange or shoulder 86 is formed adjacent the upper end of the valve and seats on a rim 87 formed at the junction of the upper end of brake relief valve chamber 81 with a slightly larger upwardly extending chamber 90 in which brake relief valve regulator spring 91 is positioned. One or more axially extending grooves 87-a are provided in the periphery of rim 87 to prevent hydraulic blocking of valve action. When the valve assembly is in its neutral position, the pressure exerted on the lower end of brake relief valve plunger 62 will cause the plunger to move upwardly, and, if sufficient to overcome the compression of spring 91, will place chamber 81 in communication with sump return passage 92, as shown in Figs. 3 and 4. Return passage 92 communicates at its right end, as viewed in Fig. 3, with the mid portion of a vertically extending return passage 93, the lower end of which may be connected through a suitable conduit to the fluid reservoir of the system. In order to prevent fluid which may escape past the upper ends of relief valves 62 and 63 into the chambers 90 and 74 from being trapped, a venting passage 98 is provided for connecting both of these passages to the sump return passage 93. Spring 91, like spring 75, is made short enough in over-all, fully extended length so that in the neutral position of the valve assembly, the brake relief valve 62 is permitted to rise substantially unimpeded by spring resistance for a suitable distance and to open the path to return passage 92 with minimum spring resistance. Thus, under neutral condition of operation, pressure supplied from the pump is returned to the pump with minimum resistance, and the work required of the pump is, accordingly, also held to a minimum, with resultant economies of operation.

By making clutch relief valve regulator spring 75 heavier than brake relief valve regulator spring 91, it will be evident that a higher pressure may be made available for clutch actuation than for brake actuation. Where a higher pressure level is required for brake control, then the lines connected to the control valve ports must be interchanged, since in a tandem arrangement only the first relief valve in a line of two can be set to open at a higher value. Thus, the maximum relief pressure to which the brake relief valve can be set corresponds to the pressure at which the clutch relief valve will release.

Referring now to Figs. 2, 5 and 6, it will be seen that a pair of control levers 94 and 95 are provided, one being positioned at the right side of the housing 55, as viewed in Fig. 2, and the other on the left side. Control lever 94 is employed to actuate either the clutch control valve 57 or the brake control valve 61. As the operation of the brake control valve 60 and the clutch control valve 56 or of the brake control valve 61 and the clutch control valve 57 is substantially identical, the description of operation will be confined to the operation of the latter set, that is, the brake control valve 61 and clutch control valve 57.

The lower end of control lever 94 is connected to the right end, as viewed in Fig. 6, of a stub shaft 96 which is journalled in and extends to the left through an aperture 97 formed in the right side wall of a cam housing 100 mounted on and secured to the upper side of the control valve housing 55, as shown in Figs. 2 and 3. The portion of shaft 96 which extends into the housing 100 is axially apertured to receive substantially the entire right half of a pilot shaft 101, the left half of pilot shaft 101 being journalled in a correspondingly apertured right portion of a shaft 103, the left end of which is secured to the lower end of the second control lever 95. Shaft 103 is journalled in the left side wall of housing 100, a suitable aperture 104 being provided therein in axial alignment with the aperture 97. Independent rotation of the shafts 96 and 103 is accomplished by pivoting the associated levers 94 and 95, respectively, to the right or to the left, as viewed in Fig. 5.

Referring now to Fig. 5, it will be seen that both the brake plunger valve 61 and clutch plunger valve 57 have associated therewith respectively a control or regulator spring 105 and 106. Regulator spring 105 bears at its lower end against the upper end of a brake plunger regulator valve member 108 loosely journalled in a slightly enlarged intermediate chamber 108–a connected at its lower end to brake valve chamber 85. At its upper end spring 105 gears against the underside of a piston 107 slidably journalled in a further enlarged, upper portion 110 of the brake valve chamber 85. Regulator spring 106 at its lower end bears against clutch plunger regulator valve member 109, loosely journalled in chamber 109–a, and at its upper end bears against the under side of a second piston 111, slidably journalled in an enlarged upper portion 112 of chamber 109–a. The purpose and operation of regulator valve members 108 and 109 will be explained hereinafter in connection with the description of the control of fluid pressure return from the brake and clutch pistons.

By moving either piston 107 or 111 downwardly, the associated spring 105 or 106 is compressed and the control valve may be opened to supply pressure to the associated hydraulic motor. Movement of these pistons 107 and 111 is controlled by a cam structure mounted on the sleeve shaft 96, the cam structure comprising a first pair of cams 113 arranged to actuate piston 111 and mounted on the right side, as viewed in Fig. 5, of a sleeve 114 keyed to and disposed coaxially of shaft 96 and a second pair of cams 115 mounted on the left side of sleeve 114 and arranged to cooperate with piston 107.

The relief value setting of relief valve 63 associated with the clutch control valves is controlled by a cam 116 mounted at the left end of sleeve 114 and the relief value setting of relief valve 62 associated with the brake control valves is controlled by a cam 117 mounted on the opposite side of sleeve 114 from cam 116. Relief valves 62 and 63, as shown in Fig. 3, have associated therewith pistons 118 and 119, respectively, and movement of the pistons downwardly in their associated piston chambers 120 and 121 causes the pressure on the springs 91 and 75 to be increased, thereby increasing the relief value level. Each of the cams 113, 115, 116 and 117 is semicircular in configuration, as shown clearly in Figs. 3 and 5, and extends radially of the sleeve 114 so that pivoting of the lever 94 causes a substantial arcuate movement of the engaging surface of the cam.

Control of the movement of brake control valve piston 107 by the associated cam set 115 is effected through a post 122 secured to the upper end of piston 107 and extending vertically upwardly into the housing 100. A nut 123 is threaded on post 122 and its upper side is engaged by the lower edges of cams 115. It will be evident, therefore, from Fig. 5, that by pivoting lever arm 94 to the left to cause a counterclockwise rotation of cam set 115, the piston 107 will be moved downwardly. By providing the threaded nut 123, adjustment of the position of piston 107 with respect to the lower peripheries of cam set 115 is provided.

Similarly, a post 124 is mounted on the upper side of piston 111 associated with the clutch control valve 57, and at its upper end there is provided a nut or flanged head 125, the upper surface of which is engageable by the under side of the cam set 113 so that by pivoting lever arm 94 to the right, the piston 111 may be moved downwardly.

It will be noted that the post 122, associated with brake piston 107, is made substantially longer than the post 124 associated with clutch piston 111 and is provided at its upper end with a flange or head 126, the intermediate upwardly extending portion of post 122 being disposed between the spaced cams 115. It will be further noted that a small protuberance 127 is provided on the upper side of each cam of the cam set 115 and is located so as to engage the under side of the flanged head 126 on post 122 when the brake valve piston 107 is in a lowered or depressed position and the control lever 94 is pivoted to the right. This particular arrangement is provided to insure that the brake control valve 61 will be fully closed to permit engagement of the brake prior to opening of the clutch control valve. In the arrangement described in conjunction with Fig. 1, it will be recalled that the brake is applied by means of a spring and released under hydraulic pressure. It has been found in practice that it is preferable to overdrive the brake in raising a load by engaging the clutch with the brake on rather than to chance dropping the load due to failure of the engine associated with the clutch drive or to slipping of the clutch. Because the operation is intermittent only, overheating of the brake is not a serious problem.

It is sometimes desirable to provide means for holding the brake in released position despite return of the control arm 94 to the neutral position. Thus, for example, where a long drag line is to be released or in any other condition where the brake is to be held released for a substantial period, it would be unnecessarily tiring for the operator to have to hold the control lever in brake release position for an extended period. Accordingly, a latch is provided in accordance with this invention by a ball detent 130 disposed in a laterally extending chamber 131, as clearly shown in Fig. 5 and a loading spring 132 bearing against the left side of ball 130 to cause it to engage the adjacent left side of brake piston 107. The periphery of piston 107 is provided with a suitable annular seating groove 133 in which the tip portion of detent ball 130 is received when the piston 107 is moved downwardly due to pivoting of the lever arm 94 to the left to align groove 133 with ball 130. When the detent ball 130 enters the groove 133, it is, due to the force exerted by spring 132, capable of preventing the piston from moving in response to the urging of spring 105 acting against the underside of the piston. However, when the lever arm 94 is moved to the right, the projections 127 on the upper side of cam set 115 engage the flanged head 126 of post 122 and positively raise the piston 107 to unseat the detent ball 130, thereby releasing spring 105 and permitting the brake control valve to close. A modified form of latch is illustrated in Fig. 8.

Control of the relief valve pistons 118 and 119 associated with relief valves 62 and 63 is effected in a manner similar to that for the pistons 107 and 111. More particularly, brake relief valve piston 118 has secured to the upper end thereof a vertically extending post 135, the upper end of which is provided with a head 136, adapted to be engaged by the under side of cam 117. Post 135 may be threaded into piston 118 and locked in position by a lock nut 137 after the vertical location of cam-engaging surface 136 has been adjusted. Similarly, piston 119 associated with the clutch relief valve 63 is provided with a post 140, which extends upwardly and terminates in a flanged head 141. Post 140 is threaded into piston 119, and a lock nut 142 is provided for securing head 141 in adjusted position. The upper surface of head 141 is adapted to be engaged by the cam 116, when this cam is pivoted downwardly.

It will be recalled that regulator spring 75 associated with the relief valve 63 and regulator spring 91 associated with relief valve 62 were described as selected so that no pressure was applied in the neutral position. Actually, each of these springs is made sufficiently short so that there is a substantial space between the upper ends of the springs and the lower side of piston 119, in the case of spring 75, and of piston 118, in the case of spring 91, when the valves 63 and 62 are in their lowermost position, this being shown clearly in Fig. 3. Therefore, it is desirable in order to prevent erratic positioning to provide some means for holding these pistons in raised position and at the same time limiting the maximum upward movement of the pistons. Light spring 143 associated with piston 119 bears at its upper end against the under side of this piston and at its lower end against a shoulder 144 formed at the junction of piston chamber 121 with slightly smaller spring chamber 74. Upward travel of piston 119 is limited by a sleeve insert 145 threaded into the upper portion of piston chamber 121 and adapted to engage at its lower end the upper surface of piston 119 when piston 119 is raised by spring 143. Similarly, there is provided a light spring 146 which is arranged to engage the underside of piston 118 at its upper end and at its lower end, a shoulder 147 provided at the junction of piston chamber 120 and the upper end of the slightly smaller brake regulator spring chamber 90, thus urging piston 118 into its uppermost position. The uppermost position of piston 118 is determined by peripherally threaded sleeve insert 150, threaded into the upper end of the piston chamber.

Since all of the cams 113, 115, 116 and 117 are rigidly mounted on the cam-supporting sleeve 114, which is keyed to the pivotable shaft 96 controlled by lever arm 94, movement of arm 94 to the right, as viewed in Fig. 5, will cause compression of spring 106 associated with the clutch control valve 57 and simultaneously will cause compression of spring 75 associated with the clutch relief valve 63. By suitably selecting the compression values of the springs 105 and 75, it will be evident that it is readily feasible to proportion the fluid pressure made available to the brake control valve directly to the pressure required. In practice, this selection has been found to involve setting the relief pressure value just slightly higher than the pressure demanded by the concurrent setting of the clutch or brake control valve. Pivoting lever 94 to the left, as viewed in Fig. 5, causes compression of springs 105 and 91 in like manner.

An identical arrangement is provided in conjunction with the control lever arm 95 effective on the left brake and clutch valves, as viewed in Fig. 2, and simultaneously effective on the mutual clutch and brake relief valve 62 and 63. Because of the identity of arrangement, it is believed that a detailed description of the operating mechanism associated with clutch and brake control valves 60 and 56 is not warranted. The operation of these valves is independent of the operation of the valves 61 and 57, since the pilot shaft 101 serves only to maintain alignment and provides no other connection between the shafts 103 and 96 associated with the control levers 95 and 94, respectively.

It will be noted that the left control lever shaft 103 has provided at the right end thereof a cam 151 which is arranged to be engageable with the left half of the head 136 of post 135 associated with relief valve piston 118, the cam 117 bearing on the right half only of head 136. Similarly, cam 152 extending from the opposite side of shaft 103 is engageable with the left half, as viewed in Fig. 6 of head 141 of post 140, associated with relief valve piston 119, the right half only of head 141 being engaged by the control cam 116. A clutch control cam set 153 also secured to shaft 103, corresponds in function and arrangement to the cam set 113 associated with the clutch control valve piston 111 and a brake control cam set 154, mounted on the opposite side of shaft 103, corresponds to the cam set 115 associated with the brake control valve piston 107. In all other details, the arrangement corresponds exactly.

Referring now in detail to the construction of the four control valves, the construction of each of which is identical with the others, it will be seen that these valves are elongated, hollow structures having an axially extending aperture 155 extending therethrough and a valving flange 156 formed adjacent the base of the valve. When a valve is closed, the flange 156 seats against the lower end of the chamber in which the valve stem or body is journalled, the lower edge of the chamber forming a valve seat. An annular groove 157 is formed about the periphery of the lower end portion of each valve body, the lower side wall of the groove being located at the smaller diameter portion of the flange 156 and the upper side wall of the groove being located a distance therefrom somewhat greater than the diameter of the fluid pressure supply passage, as for example, the entrance to passage 80 associated with brake control valve 61. Thus, pressure supplied from the supply passage is distributed equally about the periphery of the valve and unbalance of the valve body avoided, since the diameter of the chamber in which this portion of the control valve is journalled is uniform, and the sides of the grooves are of equal depth.

Each of the valve members 108 and 109, and each of the corresponding members associated with the brake and clutch control valves 60 and 56, is provided with a conical recess 160 at the lower end thereof into which the upper end portion of the control valve extends, this conical recess providing the seat for the upper terminal surface 161 of the valve. The upper end portion of each valve is slightly reduced in diameter to reduce the effective area of the terminal surface 161. Each of the intermediate chambers in which the valve members are journaled are vented to low pressure. Thus, a laterally extending passage 163 connects the lower end of chamber 109–a to the lower end of chamber 108–a and an extension 164 of this passage connects the lower end of chamber 108–a through a further passage 165 to sump return passage 93. Therefore, shoulder 166 formed at the junction of the reduced upper portion of the valve body and the main body is not subjected to pressure. Accordingly, pressure applied to the exposed lower end of the valve body and communicated through the axial passage 155 to the relatively smaller upper terminal surface 161 will be effective to tend to hold the valve seated. Seating of the valve member is also aided by springs 167 disposed in an enlarged, lower end portion 168 of each of the valve chambers. The springs 167 bear against the flanged portion 156 of the valve at their upper ends, their upper portions surrounding the portion 170 of the valve which projects below the flange 156 and at their lower ends each of the springs bears against a retainer spider 171 held in the lower end of chamber 168 by a split ring 172. From the foregoing, it will be evident that by controlling the diameter of the reduced upper end portion of each valve, with reference to the lower end area and by proper selection of spring 167, the tendency of the valve to seat may be closely regulated.

Referring now to Fig. 8, a modified form of control valve arrangement is there illustrated, the modifications being most apparent by comparing the showing of Fig. 8 with that of Fig. 5. In order to simplify the description, the same reference numerals have been employed in Fig. 8 as were employed in Fig. 5 where the parts are the same and are unchanged.

In some cases, it has been found in practice that the detent ball 130 pressing against the left side of piston 107, as shown in Fig. 5, exerts sufficient force to cause undue wear of the piston cylinder wall and the ball itself may cause scoring of the piston periphery. Where this has become a serious problem an alternative latching arrangement may be employed. Thus, the detent ball 130 and associated spring 131 may be omitted, as shown in Fig. 8, and instead a pawl 175 employed. The pawl 175 is mounted at its upper end on a stub shaft 176 carried by a lug 177 secured to the inner side of the cross portion 100–a of the cam housing 100. The lower end of the right side portion of pawl 175 is reduced or recessed to provide a shoulder 178 which, when the piston 107 is moved sufficiently downward, slips over and is engageable with the head 123 of post 122. Pawl 175 is urged in a counterclockwise direction by a flat spring 180 mounted on the left side wall of housing 100 and bearing at its right end portion against the left side of pawl 175.

In order to move the pawl 175 out of engagement with the head 123 of post 122 when the lever arm 94 is pivoted to the right to cause engagement of the clutch, a pin 181 is provided, the pin 181 being mounted between the two cam members comprising the cam set 115 in such a manner and location that the pin does not engage the side of the pawl 175 unless the lever arm 194 is pivoted to the right past its vertical or neutral position. This is accomplished by mounting the pin 181 substantially below the axis of rotation of cam set 115 so that upward movement of the cam set 115 will cause the pin 181 to move through an arcuate path which in its initial portion extends outwardly permitting the pin 181 to engage and push outwardly, that is, to the left, the pawl 175. The outward travel of pin 181 is made sufficient to unseat the shoulder 178 from the head 123 of post 122.

A modification may also be made in the control valve and associated valve member against which the upper end of the control valve seats. Thus, it has been found in practice that it is extremely difficult and expensive to form a conical valve seat, of perfect concentricity, such as desired for the seat 160, and to provide perfect concentricity of the outer periphery of the terminal surface 161 at the upper end of each valve. It will be evident that in the absence of a perfect line engagement, pressure will be permitted to leak past the valve seat to the sump return line.

To avoid this, a somewhat different arrangement of the valve seat 161 and upper terminal end of the control valve is employed. Thus, referring to Fig. 8, it will be seen that a valve member 182 may be provided, which corresponds substantially to the valve members 108 and 109, and the lower end of this valve member is cylindrically recessed at 183 to receive and guide the upper portion of a ball poppet 184. Similarly, the upper end of the axial aperture 155 extending through the valve body is sharply widened to provide a cylindrical chamber 185, the inner, upper periphery of which provides a valve seat for the ball poppet 184. The annular area 186 provided at the junction of the widened chamber portion 185 and the axial aperture 155 corresponds to the annular pressure responsive area 161 in the valves shown in Fig. 5. It will be readily evident that by selecting the amount by which chamber 185 exceeds in diameter that of the axial passage 155, the area of shoulder 186 may be closely regulated and thereby an accurate control had of the pressure unbalance tending to cause the valve to seat. At the same time, because of the high degree of concentricity available in a poppet ball type of valve the difficulties encountered in machining are largely obviated.

Operation

In the operation of this hydraulic control arrangement, pressure is admitted through the inlet port 64 and applied to the brake and clutch control valves, respectively, at values determined by their associated relief valves, as has been explained hereinabove. By pivoting the control lever 94 to the left, as viewed in Fig. 5, and thereby compressing the relief valve control spring 91, the relief pressure level of the relief valve will be increased, thus making available to the brake valve 61 increased pressure. At the same time, the spring 105 associated with the brake control valve 61 will also be compressed, tending to open the brake control valve by moving flange 156 off its seat. Since the pressure unbalance tending to hold the valve seated is readily overcome by compression of spring 105, the valve is lifted off its seat quite readily, the spring 105 also functioning in conjunction with the relief valve spring 91 to provide operating reaction or feel. Lifting of the valve 61 from its seat will cause application of pressure to the associated brake mechanism. If the lever has been pivoted far enough to the left to permit the ball detent 130 to enter the groove 133 in piston 107, then upon returning the lever to neutral position, the valve will remain open. However, when the valve is held open with the relief valve spring no longer compressed, it will be evident that the maximum pressure that can be maintained on the brake mechanism is the minimum value for which the relief valve is set. Thus, if the brake valve be held in the open position, with the lever arm 94 in neutral position, the load on the pressure supply system is reduced to a minimum.

Return pressure from the brake mechanism is effective to move the brake valve member 108 upwardly, upon overcoming the compression of spring 105. In one production embodiment, the return spring of the brake servomotor is made sufficiently strong to overcome the resistance provided by the valve member control spring when the latter is not compressed by pivoting the control lever, thus permitting return of pressure fluid to the sump. The resistance provided by the control spring 105 serves, however, to prevent emptying of the actuating system, thus keeping the system in readiness for operation.

Pivoting the control arm 95 to the right, as viewed in Fig. 5, raises brake piston 107 and compresses the spring 75 associated with clutch relief valve 63, thereby raising the relief pressure and making available to the clutch control valve 57 and clutch actuating mechanism connected thereto a higher value of pressure. At the same time, clutch control valve 57 will be moved downwardly to open the degree of opening depending on the amount by which the control lever is pivoted to admit pressure to the clutch mechanism. The operation is essentially the same as that of the brake mechanism except that no provision is made for holding the clutch control valve in open position. Upon return of the lever arm to the neutral position, return pressure from the clutch actuating mechanism is effective to move the valve element 109 upwardly to permit return of pressure to the sump.

The operation of the control valves under control of lever arm 94 is identical to that of the control valves under control of lever arm 95. The arrangement shown economizing by employing a single set of relief valves for both sets of control valves.

Where herein the various parts of this invention have been referred to as being located in a right or a left position or an upper or lower position, it will be understood that this is done solely for the purpose of facilitating description and that such references relate only to the relative positions of the parts as shown in the accompanying drawings.

What is claimed is:

1. In a hydraulic control valve system, a pair of relief valves connected in tandem, resilient means associated with the first in line of said relief valves for yieldingly holding said relief valve in closed position, resilient means associated with the second in line of said relief valves for holding said second relief valve in closed position, said second resilient means providing a lesser compression force than said first resilient means, said second relief valve being responsive to pressure made available to it through said first relief valve, a first control valve connected in said system so that the pressure supplied to said control valve is regulated by said first relief valve, a second control valve connected in said system so that the pressure supplied to said second control valve is controlled by said first and second relief valves, and means effective upon opening of either of said control valves to increase the pressure level at which the associated relief valve will open.

2. A hydraulic control valve system including, a relief valve for controlling the supply pressure level made available to the system, a piston for actuating said valve, a spring interposed between said valve and said piston, a control valve having an axially extending passage formed therethrough, a second piston for opening said control valve, a shiftable valve interposed between said second piston and said control valve, said shiftable valve member being arranged to seat on one end of the passage formed through the control valve, a spring interposed between said control valve member and said second piston, and lever and camming means cooperating with said pistons and springs for increasing the pressure supply response level of said valves simultaneously with and in proportion to any degree of opening of said control valve, the increase in response level of said valves and the degree of opening of said control valve being reflected into the lever means by a proportionate increase in resistance of said springs.

3. In a hydraulic control system, means defining a valve chamber, means defining a pressure supply port communicating with said chamber, means defining a relief valve for determining the maximum amount of supply pressure for said chamber, means defining a pressure utilization port communicating with said chamber, means defining a third port communicating with said chamber to place said chamber in communication with a zone of relatively low pressure, a groove formed about the outer peripheries of said valve adjacent one end thereof and located so as to receive supply pressure from said first port, one side wall of said groove defining the valve surface of said valve, said valve when shifted to open position placing said supply port and said utilization port in communication, a first pressure responsive surface on said control valve exposed to return pressure from said utilization port, a second pressure responsive surface of lesser area on said control valve also exposed to return pressure, said first pressure responsive area being located so that in response to pressure applied thereto the valve tends to seat, said second pressure responsive area being located so that in response to pressure applied thereto the valve tends to open thereby providing refined hydraulic control over the forces tending to seat said valve, and means for actuating said relief valve for increasing the response level of said valve to supply pressure simultaneously with the shifting of the control valve to open position.

4. In a hydraulic system, a control valve, means defining a pressure supply port in said control valve, relief valve means for determining the maximum level of supply pressure available to said control valve, means balancing said valve whereby said valve is not shifted in response to supply pressure variations, a first pressure responsive surface on said valve exposed to return pressure and tending in response to return pressure to hold said valve closed, a second pressure responsive surface on said valve exposed to return pressure and tending in response to return pressure to open said valve, said second surface having lesser extent than said first surface whereby said valve has a pressure unbalance and normally remains closed yet provides refined hydraulic control over the forces tending to close said valve, and means for overcoming the pressure unbalance and simultaneously causing said relief valve means to increase its maximum pressure response level to effect an increase in supply pressure made available to the control valve.

5. In a hydraulic system, a control valve having a pressure supply port and a pressure discharge port, means for controlling the supply of pressure to said control valve, means for supplying pressure to said control valve, means balancing said valve to supply pressure whereby said valve is not shifted in response to supply pressure variations, a first pressure responsive surface on said valve exposed to return pressure from said discharge port and tending in response to return pressure to hold said valve closed, a second pressure responsive surface on said valve exposed to return pressure and tending in response to return pressure to open said valve, said second surface having lesser extent than said first surface whereby said valve has a pressure unbalance and normally remains closed yet provides refined hydraulic control over the forces tending to close said valve, means overcoming said pressure balance and for opening said valve, and means for rendering inoperative said last-mentioned means whereby said first surface may hold said valve closed.

6. In a hydraulic system, a control valve including an inlet port for receiving supply pressure and an outlet port for discharging pressure, means for supplying pressure to said control valve, means balancing said valve to supply pressure whereby said valve is not shifted in response to supply pressure variations, a first pressure responsive surface on said valve exposed to return pressure and tending in response to return pressure to hold said valve closed, a second pressure responsive surface on said valve exposed to return pressure tending in response to return pressure to open said valve, said second surface having lesser extent than said first surface whereby said valve has a pressure unbalance and normally remains closed yet provides refined hydraulic control over the forces tending to close said valve, means for overcoming said pressure unbalance and for opening said valve, a relief valve associated with said control valve and arranged to open in response to return pressure of a predetermined value, and means for rendering inoperative said last-mentioned means whereby said first surface may hold said valve closed.

7. In a hydraulic system, a pair of control valves including an inlet port for receiving supply pressure and a pair of outlet ports for discharging pressure, means connecting said valves to a source of supply pressure including a pair of relief valves disposed between said control valves and said inlet port, one of the pair of said relief valves being responsive to a pressure level determined by the other of said relief valves, and means for opening said control valves a required degree, and means common to said control valves and to one of said relief valves for increasing the level of pressure required to open one of the relief valves in proportion to the pressure demand as indicated by the degree of opening of one of the control valves.

8. In a hydraulic system, a control valve including an inlet port for receiving supply pressure and an outlet port for discharging pressure, means for communicating supply pressure to said control valve, including a relief valve, means for increasing the pressure required to open the relief valve in proportion to the pressure demand as indicated by the degree of opening of the control valve, a second relief valve associated with said control valve and responsive to return pressure from said outlet port, means for simultaneously increasing the pressure required to open said second relief valve as the pressure required to open the first relief valve is increased to prevent opening of the second relief valve in response to supply pressure, and means for maintaining said control valve in open position when desired.

9. A hydraulic control system, an inlet port, and an outlet port, means defining a first set of control valves, and a second set of control valves, means defining a pair of relief valves, said inlet port being in communication with one of said relief valves, said second relief valve being placed in communication with said first relief valve, said first relief valve being in open communication with said first set of control valves, said second relief valve being in communication with said first relief valve only at a pressure level determined by said first relief valve, said second set of control valves being in communication with said second relief valve irrespective of the position of said second relief valve, and means common to said first relief valve and to at least one of said first set of control valves to increase the pressure response level of said first relief valve in proportion to the pressure demand as indicated by the degree of opening of at least one of said first set of control valves, and means common to said second relief valve and to at least one of said second set of control valves for increasing the pressure response level on said second relief valve in proportion to the pressure demand as indicated by the degree of opening of at least one of said second set of control valves.

10. A hydraulic control system as claimed in claim 9 wherein each of said control valves has associated therewith a relief valve responsive to return pressure from said outlet port, and the pressure response level of said last-mentioned relief valve being increased simultaneously with the opening of its associated control valve.

11. A hydraulic control system as claimed in claim 9 wherein said means common to said first relief valve and to at least one of said first set of control valves is also common to said means common to said second relief valve and to at least one of said second set of control valves and is provided with means to insure that said one of said second set of control valves will be fully closed prior to the opening of said first set of control valves.

References Cited in the file of this patent

UNITED STATES PATENTS

| | | |
|---|---|---|
| 1,927,700 | Dickinson | Sept. 19, 1933 |
| 2,075,917 | Vorech | Apr. 6, 1937 |
| 2,225,082 | Orshansky, Jr., et al. | Dec. 17, 1940 |
| 2,243,364 | Trautman | May 27, 1941 |
| 2,392,421 | Stephens | Jan. 8, 1946 |
| 2,426,411 | Peterson | Aug. 26, 1947 |
| 2,438,389 | Edge | Mar. 23, 1948 |
| 2,448,532 | Kirkman | Sept. 7, 1948 |
| 2,527,943 | Lee | Oct. 31, 1950 |
| 2,592,353 | Stevenson | Apr. 8, 1952 |